United States Patent
Lange et al.

(10) Patent No.: US 8,199,679 B2
(45) Date of Patent: Jun. 12, 2012

(54) ENTERPRISE VIRTUAL PRIVATE LAN SERVICES

(75) Inventors: Andrew S. Lange, Culver City, CA (US); L. Michele Goodwin, Westlake Village, CA (US)

(73) Assignee: Alcatel Lucent, Paris (FR)

( * ) Notice: Subject to any disclaimer, the term of this patent is extended or adjusted under 35 U.S.C. 154(b) by 133 days.

(21) Appl. No.: 12/457,047

(22) Filed: May 29, 2009

(65) Prior Publication Data

US 2010/0302973 A1 Dec. 2, 2010

(51) Int. Cl.
*H04L 12/28* (2006.01)
(52) U.S. Cl. .......................... 370/255; 370/401
(58) Field of Classification Search .................. 370/254, 370/255, 395.2, 395.3, 400, 401
See application file for complete search history.

(56) References Cited

U.S. PATENT DOCUMENTS

| | | | | |
|---|---|---|---|---|
| 7,408,941 B2* | 8/2008 | Martini et al. | ........... | 370/395.53 |
| 7,633,859 B2* | 12/2009 | Filsfils et al. | ................ | 370/225 |
| 7,733,883 B2* | 6/2010 | Li et al. | ........................ | 370/401 |
| 7,792,123 B2* | 9/2010 | Hu | ........................... | 370/395.53 |
| 7,826,482 B1* | 11/2010 | Minei et al. | ................... | 370/467 |
| 7,839,869 B1* | 11/2010 | Fotedar et al. | ................ | 370/401 |
| 2005/0097203 A1* | 5/2005 | Unbehagen et al. | .......... | 709/223 |
| 2005/0265308 A1* | 12/2005 | Barbir et al. | .................. | 370/351 |
| 2006/0062218 A1* | 3/2006 | Sasagawa | ..................... | 370/389 |
| 2008/0120427 A1* | 5/2008 | Ramanathan et al. | ........ | 709/230 |
| 2009/0103538 A1* | 4/2009 | Yoshimi | ....................... | 370/392 |

OTHER PUBLICATIONS

A. Atlas et al., "Basic Specification for IP Fast-Reroute: Loop-free Alternates", Routing Area Working Group, RFC 5286, Sep. 2008, pp. 1-31.
L. Anderson et al., "LDP Specification", Routing Area Working Group, RFC 5036, Oct. 2007, pp. 1-61.

* cited by examiner

*Primary Examiner* — Hong Cho
(74) *Attorney, Agent, or Firm* — Harness, Dickey & Pierce, P.L.C.

(57) ABSTRACT

Example embodiments are directed to methods of configuring a virtual private local area network service for an enterprise. At least one method includes assigning a virtual private local area network instance to a first node within a network. A first node attempts to establish a label distribution protocol session between the first node and at least one other node within the network based on an interior gateway protocol map. The interior gateway protocol map identifies the at least one other node and nodes connected to the at least one other node. The virtual private local area network service is established based on the label distribution protocol sessions that are established.

15 Claims, 3 Drawing Sheets

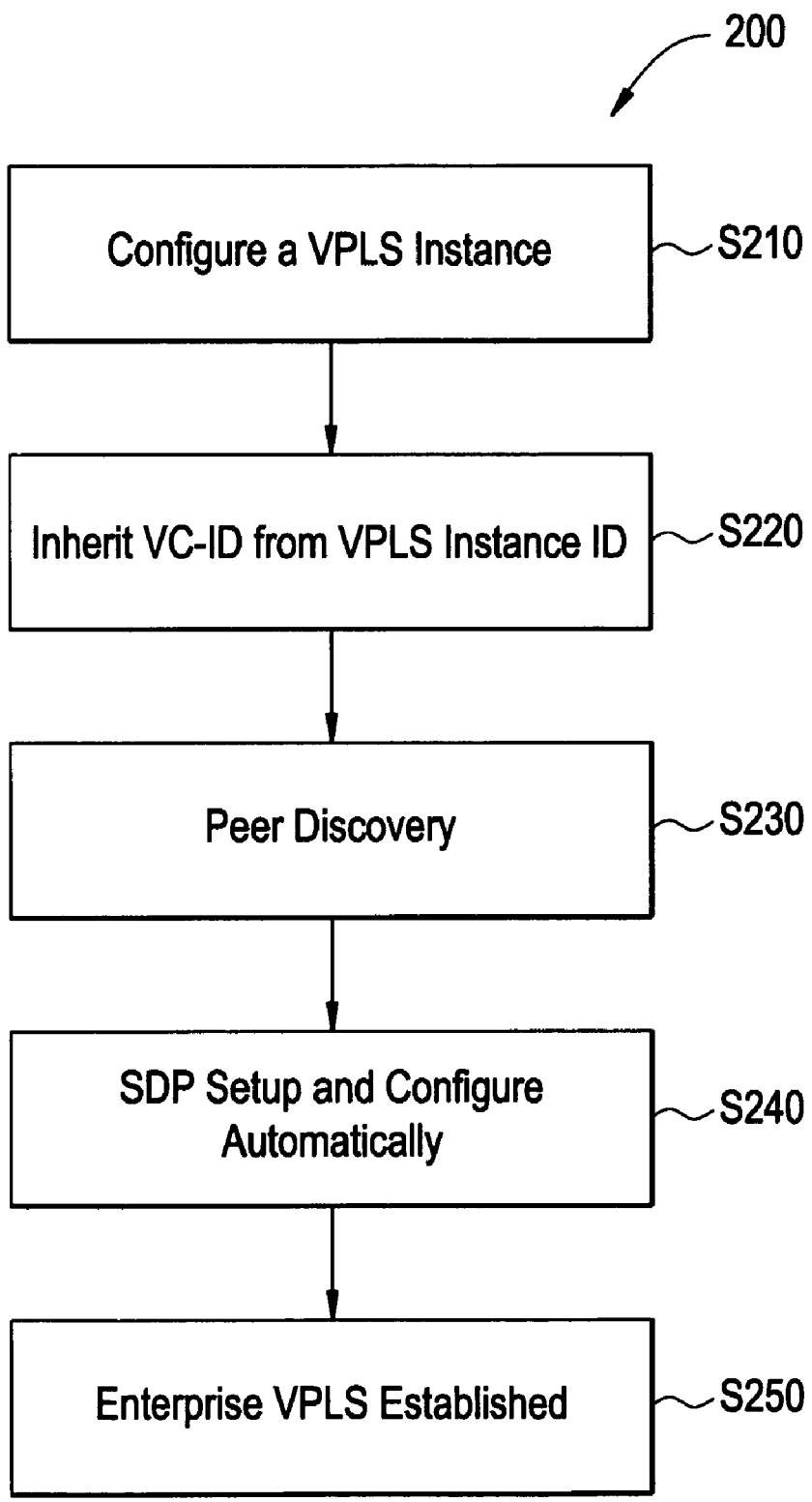

ENTERPRISE VIRTUAL PRIVATE LAN SERVICES

BACKGROUND

Virtual private local area network services (VPLS) and pseudowires were created to overcome the problems of Ethernet loops and the Spanning Tree Protocol (STP). VPLS provides the option of multiple paths and eliminates delays and stoppages that often occur in STP-based networks. In Ethernet networks there is no time-to-live (TFL) in the Ethernet frames, creating a critical problem when there are loops in the network. Traffic will go around the loop forever, eventually congesting all the links on the loop and causing the network to collapse. To break these loops, STP was developed. However, STP converges slowly, resulting in network interruptions every time there is a change in the network topology. Furthermore, STP breaks loops by setting some links as "blocking" or inactive. This means that much of the capacity put into the network cannot be used. Instead it sits idle, waiting for a failure to occur.

VPLS was developed to create highly-reliable wide-area Ethernet networks. VPLS runs on top of pseudowires. A pseudowire emulates a transmission protocol. As one of ordinary skill would understand, pseudowire technology is the technique of carrying non-IP traffic over MPLS or IP tunnels.

For example, in the case of an Ethernet pseudowire in a VPLS network, the Ethernet pseudowire emulates an Ethernet connection by encapsulating an Ethernet frame into a multi-protocol label switching (MPLS) packet. The pseudowire includes two levels of encapsulation. At the first level, the Ethernet frame is wrapped in an inner label. The inner label determines the service that the pseudowire belongs to and is used at transmitting and receiving ends to demultiplex multiple pseudowires and find the correct switching context for the underlying traffic. The second encapsulation is an outer label which can be a multiprotocol label switching (MPLS) label, an IP header, or any one of the IP capsulations, such as GRE or IPSec.

The VPLS network uses the outer label to transmit the frame to a destination such as a router or MPLS switch. When the frame arrives at the destination, the destination strips the outer label and looks at the inner label. The inner label, which is a service label, indicates a particular service that the destination is configured to perform. The destination then switches the inner label to the particular service.

For example, a service may be Ethernet switching where the service label indicates which local Ethernet switching table/context to use. An underlying Ethernet destination MAC address is looked up in the Ethernet switching table to determine which port, and which Ethernet encapsulation to use in forwarding the frame.

FIG. 1A illustrates an example of a conventional VPLS network. The VPLS network 10 may include two nodes 20 and 30 connected together through an IP/MPLS network 40. Each of the nodes 20 and 30 is provided with at least one service which is identified by the value of the service label (e.g., service-ID). Each of the nodes 20 and 30 includes a service distribution point (SDP) 25 and 35, respectively. The service distribution points 25 and 35 allow the nodes 20 and 30 to link together through the IP/MPLS network 40.

Customer access ports 50 may access the node 20 through a service access point (SAP) 55. Similarly customer access ports 60 may access the node 30 though a SAP 65.

In VPLS, an interior gateway protocol (IGP), such as open shortest path first (OSPF) or intermediate system to intermediate system (ISIS) is brought up between the nodes in the network providing the VPLS service. The IGP allows the network to discover its topology, the shortest paths between each of the nodes, and automatically reroute around failures in the network. Furthermore, SAPs are added for local attachments at the end of the network. As understood by one of ordinary skill in the art, a SAP is a provisioning construct that is used to define the attached service. For example, the SAP may be used to define an Ethernet service attaching to the VPLS service with a particular virtual local area network identification (VLAN ID).

A carrier VPLS network is generally implemented by establishing a SDP configuration with other end nodes. A SDP is a provisioning construct that is used to abstract the method of getting from one provider edge (PE) at a node to another PE at another node. More specifically, the SDP ties a service to far end SAPs without having to specifically define the far end SAPs. The PE may be a router at the edge of a provider's network, for example.

Second, the SDP is bound to a label switched path (LSP), if MPLS is used, or an IP tunnel, such as GRE. In effect, the SDP defines what outer encapsulation a service will use to get from one PE to another. A separate SDP may be created for each PE pair.

Third, the VPLS service is configured. A VPLS service may be configured by entering into each PE router, the appropriate service configuration. The appropriate service configuration includes the local and remote virtual circuit identification (VC-ID) values which determine the inner label values, and setting up other specific values required for the particular service.

Lastly, mesh-SDP configurations are configured inside the VPLS service by using Targeted Label Distribution Protocol (T-LDP) to exchange labels.

Border Gateway Protocol (BGP) and Remote Authentication Dial In User Service (RADIUS) can be adapted and used to improve the automation of a VPLS configuration.

BGP handles automating peer discovery as well as signaling virtual circuit (VC) labels between peers. However, BGP is a large and complicated protocol. Furthermore, when BGP is used for VPLS, a transport tunnel network setup needs to be configured through other means, as well as any traffic optimization. In addition, BGP is a protocol that is familiar only to large network carriers. Most enterprise networks are completely or mostly unfamiliar with BGP.

RADIUS is used to automate VPLS peer discovery. Each PE may query a RADIUS server for a list of all of the peers in a VPLS network. Generally, peers may include PEs that have the same service configured. However, RADIUS is not fully automatic and requires an administrator to dedicate a server and program all the host addresses for the PE devices, the desired service labels, and the correct customer connection information. Furthermore, RADIUS does not automatically update with new PE information and each PE in a VPLS network will need to know the server's address and authentication information.

A VPLS network may often be difficult to set up. VPLS networks require expertise and knowledge to effectively create, deploy and administer. For example, inner and outer labels need to be configured, service parameters need to be set up and transport tunnels need to be defined via SDP configuration.

For a carrier that employs hundreds of people that are network experts, and has extensive support systems, setting up a VPLS network may be done easily.

However, enterprise environments such as law firms and hospitals typically have a limited IT staff. Moreover, those employed on the IT staff usually tend to be generalists and are not specialized. The complexity of VPLS limits the adoption of VPLS in enterprises.

SUMMARY

Example embodiments are directed to methods of configuring an enterprise VPLS.

At least one example embodiment provides a method of configuring a virtual private local area network service. The method includes assigning a virtual private local area network instance to a first node. The first node attempts to establish a label distribution protocol session between the first node and at least one other node within a network based on an interior gateway protocol map. The interior gateway protocol map identifies at least one other node and nodes connected to at least one other node. The virtual private local area network service is established based on the label distribution protocol sessions that are established.

At least some other example embodiments provide a method of discovering nodes in a virtual private local area network service using an interior gateway protocol. The method includes receiving, by one of a plurality of nodes, a list of the plurality of nodes from an interior gateway protocol map. The interior gateway protocol map is established by the interior gateway protocol and identifies connections between the plurality of nodes. One of the plurality of nodes attempts to establish a label distribution protocol session with at least one other of the plurality of nodes.

BRIEF DESCRIPTION OF THE DRAWINGS

Example embodiments will be more clearly understood from the following detailed description taken in conjunction with the accompanying drawings. FIGS. 1A-4 represent non-limiting, example embodiments as described herein.

FIG. 1A illustrates a conventional VPLS network;

FIG. 2 illustrates a method of configuring an E-VPLS network according to an example embodiment; and FIG. 3 illustrates a method of automatic peer discovery in an E-VPLS network according to an example embodiment.

DETAILED DESCRIPTION

Figure 1A:
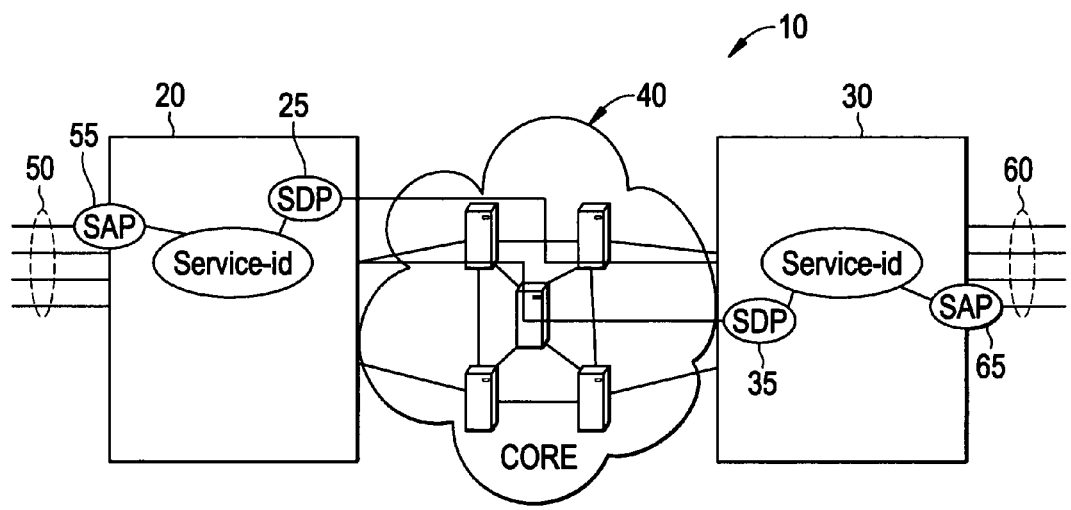

Various example embodiments will now be described more fully with reference to the accompanying drawings in which some example embodiments are illustrated. In the drawings, the thicknesses of layers and regions may be exaggerated for clarity.

Before discussing example embodiments in more detail, it is noted that example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods illustrated by the flow charts discussed below may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the present invention and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements or control nodes (e.g., a scheduler located at a base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Example embodiments provide methods of reducing the complexity of VPLS. Furthermore, example embodiments provide an enterprise VPLS (E-VPLS) with reduced complexity. An E-VPLS may include an easily configurable VPLS, IP fast rerouting (IP-FRR), operations, administration and management (OAM) tools and visualization. Rather than having to configure and set up all the parameters, the example embodiments take advantage of information that is in the network. Furthermore, the example embodiments provide methods of automatic peer discovery.

Figure 1B:
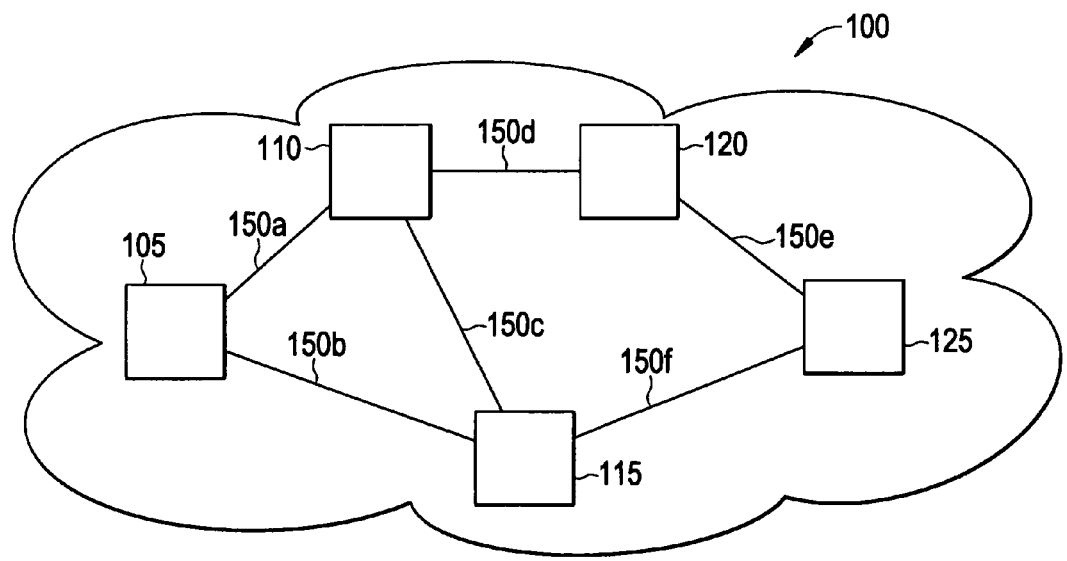
FIG. 1B illustrates an enterprise VPLS (E-VPLS) network according to an example embodiment.

FIG. 1B illustrates an example E-VPLS network. As shown in FIG. 1B, an E-VPLS network 100 includes nodes 105, 110, 115, 120 and 125. The nodes 105, 110, 115, 120 and 125 may be routers or switches and similar to the nodes 20 and 30 illustrated in FIG. 1, for example. Each of the nodes 105, 110, 115, 120 and 125 may also be a PE if the node is attached to a customer and is not used for pure transit.

In the E-VPLS network 100 service tunnels (which are inner labels) are set up and configured automatically as will be described. Outer labels in the E-VPLS network 100 may be a Generic Routing Encapsulation (GRE) header, IPSec based header, or MPLS based header set up. In the example of FIG. 1B, the E-VPLS network 100 may be an MPLS network. However, one should understand that the network 100 may be based on a protocol other than MPLS.

To establish Label Switched Paths (LSPs) between the nodes 105, 110, 115, 120 and 125, a signaling protocol such as Label Distribution Protocol (LDP) may be used. LDP distributes Forwarding Equivalence Class (FEC)-label bindings using underlying routing information, including Interior Gateway Protocol (IGP) information, to build a LSP along a best routed path in a MPLS network for the FEC. Therefore, an enterprise may use IGP to allow LDP signaling from node to node and to detect and reroute around failures.

A MPLS capable device can then switch on the labels, rather than the underlying IP addresses. This allows for virtual private networks (VPN), where the IP address space may overlap. The underlying IP addresses are assigned to a FEC, which includes a virtual private network (VPN) context, and assigned a label.

LDP is run between a pair of nodes, for example, nodes 105 and 110. The network uses the IGP for the LDP signaling to get from node to node and to detect and reroute around failures.

LDP Sessions are set up between nodes, and labels are distributed when there is a change (e.g., create, change, delete labels). A hello message verifies the existence of an LDP peer, and a set of error messages handles various error state conditions.

Each of the nodes 105, 110, 115, 120 and 125 has a loopback address (e.g., system-ID). For example, the loopback addresses may be IP addresses for the nodes 105, 110, 115, 120 or 125, respectively. The loopback address for each of the nodes 105, 110, 115, 120 and 125 is shared as an FEC among the nodes 105, 110, 115, 120 and 125 in the network 100.

Therefore, the network 100 will result in a mesh of LSPs that interconnects each of the nodes 105, 110, 115, 120 and 125. The IGP ensures that the shortest paths are used to reach each of the nodes 105, 110, 115, 120 and 125 and ensures that there are no loops.

The node 105 is connected to the nodes 110 and 115 by paths 150*a* and 150*b*, respectively. The node 110 is also connected to the nodes 115 and 120 by paths 150*c* and 150*d*, respectively. The node 115 is also connected to the node 125 by a path 150*f*. The node 120 is also connected to the node 125 by a path 150*e*.

As shown in FIG. 1B, LSPs have been established based on the LDP that is used in the network 100. For example, an LSP from the node 105 to the node 120 may include the paths 150*a* and 150*d*, if metrics are all the same across the network and there are no network failures.

While only the nodes 105, 110, 115, 120 and 125 are illustrated, it should be understood that the VPLS network may include more than five nodes.

The E-VPLS network 100 may run on an IGP such as OSPF or ISIS. The IGP allows one end of the E-VPLS network 100 to know where the other ends of the network are and how to get there. Therefore, each of the nodes 105, 110, 115, 120 and 125 will store a IGP Topology Map that lets each other node know of the connections within the network. More specifically, Link State Advertisement packets are used between the nodes 105, 110, 115, 120 and 125 to discover other nodes and to distribute routing information. For example, each of the nodes 105, 110, 115, 120 and 125 will calculate and store the following IGP Topology Map.

| Node | Connections |
|---|---|
| 105 | 110, 115 |
| 110 | 105, 115, 120 |
| 115 | 105, 110, 125 |
| 120 | 110, 125 |
| 125 | 115, 120 |

FIG. 2 illustrates a method of configuring an E-VPLS from a node. As an example, the node may be any one of the nodes 105, 110, 115, 120 and 125. At S210, a VPLS instance is created by an operator at the node. The operator may configure the VPLS instance by entering "configure e-vpls e-vpls-id" in a command prompt for the node, for example, "configure e-vpls 100".

A VPLS instance is the local switching context, including, for example, a separate table of MAC addresses for local Ethernet forwarding, attachment links (SAPs), and the method of sending packets to other nodes (SDP assignments). In a service router operating system (e.g., SR-OS) the VPLS instance may be created on the system once the command is entered by the operator. The E-VPLS service is shared across the systems (e.g., routers).

The E-VPLS may be established in a shutdown state. This is to allow the operator to set up all the parameters correctly before turning the system on. It should be understood that "system" and "node" have the same meaning and may be used interchangeably. When the E-VPLS is activated, a table space is allocated in the node The table space is for a local switching context table, for example, a MAC address table for an Ethernet VPLS. The table is allocated based on the hardware in the system and the implementation of the system.

If there are no E-VPLS SDPs active, then the system attempts to bring up SDPs to every other node in the same IGP area as the node. More specifically, a PE within the network looks at the IGP Topology Map. In the IGP Topology Map, the PE can see the loopback addresses (e.g., system-IDs) of all the other nodes in the network. The node then establishes a targeted-LDP session with each of those nodes and uses that session to exchange service (inner) labels. In this case, the node receives the service label from the VPLS Instance ID, for example, 100.

At S220, the VPLS Instance ID is used as the Virtual Circuit ID (VC-ID) in T-LDP advertisements to neighboring nodes. The node advertises by establishing a T-LDP session to other nodes using standard T-LDP. Once the node and another node exchange a corresponding set of inner labels, which indicate they both have the same e-vpls instance configured on them, the nodes become part of the same E-VPLS.

SDP-IDs may be automatically created based on the SDPs configured using a remote node's loopback address, or FEC (e.g., LDP LSP). The VC-ID may be overridden as the VPLS Instance ID in the service configuration. The service configuration is the configuration section that specifies service parameters such as billing and ingress/egress shaping.

During an automatic peer discovery at S230, E-VPLS SDP targets are determined by examining the IGP Topology Map and seeing the loopback address/system IDs of the remote nodes. The node uses the IGP Topology Map to attempt to establish a T-LDP session with each remote node to determine which VPLS instances are configured on the remote system. Since T-LDP runs and each node's system/loopback IP address is shared as an FEC, there exists a transport tunnel system for pseudowires to cross remote nodes.

Since the IGP Map is used for peer discovery, a new IGP link-state advertisement (LSA) is not needed. Thus, the peer discovery becomes easier to implement and deploy.

Once the peers are discovered, SDP is setup and configured automatically at S240. As described above, the loopback address for each of the nodes 105, 110, 115, 120 and 125 is shared as an FEC among the nodes 105, 110, 115, 120 and 125 in the network 100.

Therefore, the network 100 will result in a set of LSPs that interconnects each of the nodes 105, 110, 115, 120 and 125. Thus, the LDP can automate the building of a full MPLS network based on the loopback address information gleaned from the IGP. The setup is dynamic and may continue over time.

Once SDP setup and configuration is conducted at S240, the E-VPLS is formed. It should also be understood, that the E-VPLS may be formed entirely within a node. At S240, local forwarding contexts are established and local attachments are assigned to SAPs.

The E-VPLS network can harness other types of transport for pseudowires other than LDP based MPLS tunnels. This can be done by disabling the LDP SDP type and assigning SDP in a normal fashion. These SDPs can be LSPs (RSVP or Static) or GRE tunnels. Other forms of encapsulation may also be used.

Figure 3:
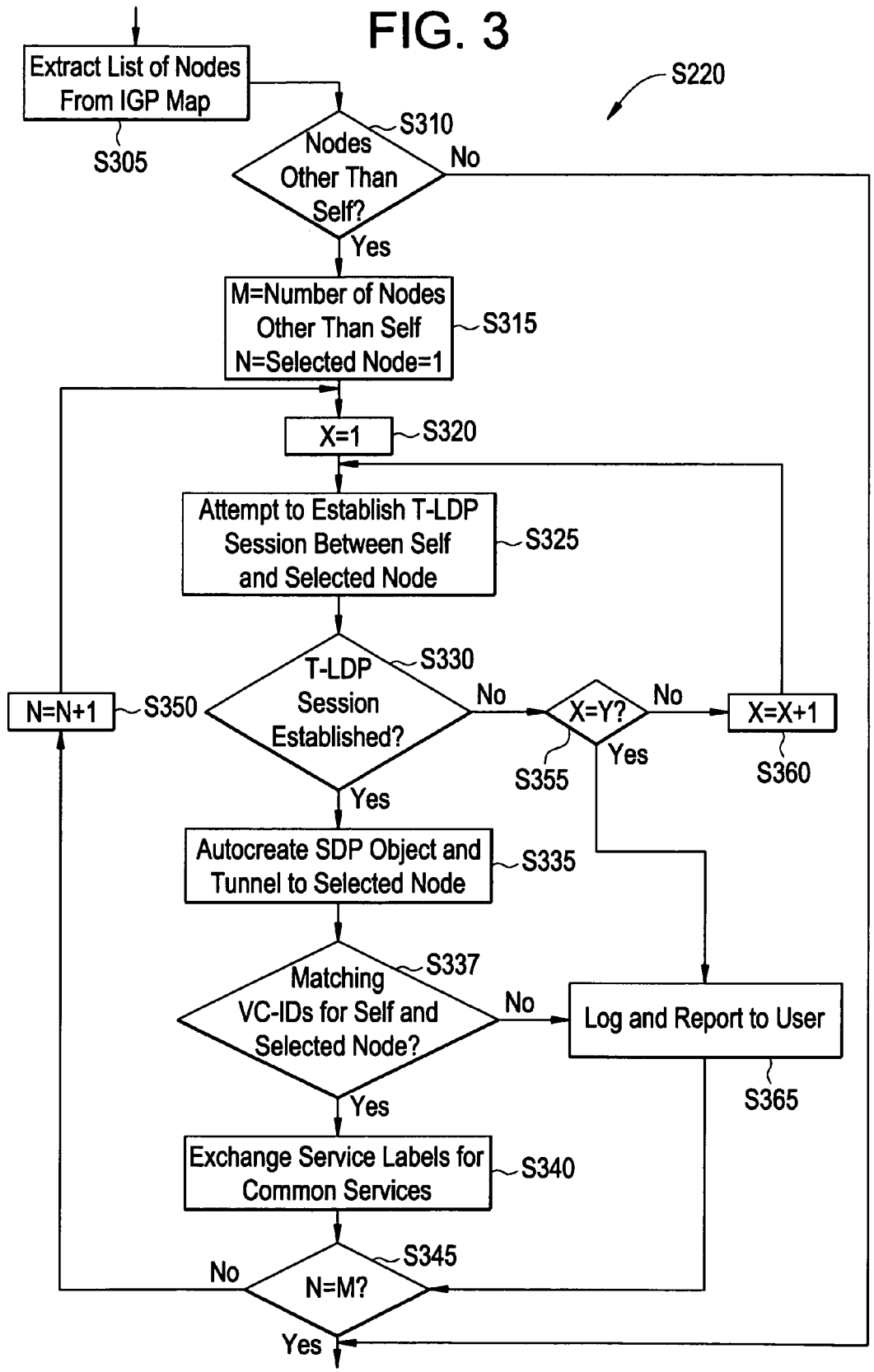

FIG. 3 illustrates the automatic peer discovery S220 as shown in FIG. 2. Each PE in a node that participates in the E-VPLS may perform the method illustrated in FIG. 3. As described above, each of the nodes 105, 110, 115, 120 and 125 in the E-VPLS network exchanges routes with a loopback address (e.g., router ID). The loopback address may be an IP address for the corresponding PE router in the node. The loopback addresses are collected by each of the nodes 105, 110, 115, 120 and 125 and are used to find E-VPLS peers (e.g., other nodes) by using the loopback addresses for T-LDP sessions.

As shown, the automatic peer discovery S220 includes receiving the list of nodes from the IGP Map at S305. As previously described, the IGP map identified the connections between various nodes in a network. For example, when the node 105 receives the list of nodes from the corresponding IGP Map at S305, the node 105 will identify the nodes 110, 115, 120 and 125 with their respective router IDs.

At S310, the node determines whether there are nodes in the map other than itself. If no nodes exist other than the node performing the automatic peer discovery S220, then the automatic peer discovery S220 is completed.

If other nodes do exist, then the node performing the automatic peer discovery S220 determines the number of nodes and selects a node at S315. For example, the node 105 determines that there are four other nodes 110, 115, 120 and 125. The node 105 may then select the node 110. It should be understood that the node 105 may select any node in the network 100 and the order of nodes that are selected may not be predetermined.

At S325, the node attempts to establish a T-LDP session between the node and the selected node using the router ID of the selected node. At S320, before the node attempts to establish a T-LDP session, the number of attempts X is initialized at 1.

The node determines whether a T-LDP session has been established with the selected node at S330. If there is an entry in the node's IGP Topology Map with the same loopback address (e.g., system-ID) as the selected node, a T-LDP session is established. System-ID and loopback address may be used interchangeably and, therefore, have the same meaning.

If the T-LDP session is established, then an SDP object is autocreated and a tunnel is formed to the selected node at S335. The tunnel may be formed by techniques known in the art. The tunnel may be a GRE or LDP tunnel, for example.

If the VC-IDs for the node and the selected node match at S337, then service labels the configured VPLS instances are exchanged between the node and the selected node at S340. The labels are exchanged so that each node in the E-VPLS network will be able to identify the received VPLS frames in the correct VPLS instance (e.g., a forwarding table/context unique to that VPLS). Multiple forwarding contexts/tables allow one node to support separate virtual networks without collision between traffic. This means privacy and security of the underlying traffic is assured.

Since the VPLS Instance IDs are used as the VC-IDs, the connection between the node and the selected node will be terminated if the node and the selected node do not have matching VPLS instances at S337. The nodes in the E-VPLS network will monitor their respective T-LDP sessions statuses, loopback address statuses, and VPLS instance statuses in step S365. The loopback address status and VPLS instance status may change when a router fails or another one is added to the E-VPLS network or if a new E-VPLS service is configured.

If a T-LDP session has not been established at S330, the number of attempts X is checked to determine if a maximum number of unsuccessful attempts Y have been reached at S355. If the number of attempts X equals the maximum number of unsuccessful attempts Y, then the node logs the unsuccessful attempts and reports to a user (e.g., an administrator) that a T-LDP session was not established at 365. If the number of attempts X is not equal to the maximum number of unsuccessful attempts Y, then the number of attempts X is incremented by one at S360. Then the node attempts to establish the T-LDP session again at S325.

By logging unsuccessful attempts, possible VC-ID misconfiguration, such as mismatching security keys may be detected.

Once the unsuccessful attempts have been logged and reported at S365, the node determines whether all the other nodes in the IGP Topology Map have been selected at S345. If all the nodes in the IGP Topology Map have not been selected, then the node performing the automatic peer discovery at S220 proceeds to select another node at S350 and repeat the process of attempting to establish a T-LDP session. The process is repeated until all the nodes in the IGP Topology Map have been selected.

The E-VPLS may be linked with IP Fast Reroute (IP FRR). For example, at least one of the nodes 105, 110, 115, 120 and 125 may be commanded in the respective command prompt to turn on IP FRR. An example of IP FRR is described in "Basic Specification for IP Fast-Reroute: Loop-free Alternates." Routing Area Working Group, RFC 5286, September 2008.

As described above in the example embodiments, the E-VPLS is easy to provision and eliminates steps that are necessary when implementing a conventional VPLS network.

Example embodiments being thus described, it will be obvious that the same may be varied in many ways. Such variations are not to be regarded as a departure from the spirit and scope of the example embodiments, and all such modifications as would be obvious to one skilled in the art are intended to be included within the scope of the claims set forth.

What is claimed is:

1. A method of configuring a virtual private local area network service, the method comprising:
   assigning, by an operator, a virtual private local area network instance to a first node;
   transmitting, by the first node, a signal to establish a label distribution protocol session between the first node and at least one other node within the network based on an interior gateway protocol map, the interior gateway protocol map identifying the at least one other node and nodes connected to the at least one other node; and
   establishing, by the first node, the virtual private local area network service based on the label distribution protocol sessions that are established.

2. The method of claim 1, further comprising:
   creating a service distribution point identification when a label distribution protocol session is established.

3. The method of claim 2, further comprising:
   exchanging service labels between the first node and the at least one other node.

4. The method of claim 1, wherein the transmitting is performed periodically.

5. The method of claim 1, wherein the transmitting is performed when another node is added to the interior gateway protocol map.

6. The method of claim 1, wherein the assigning includes assigning a virtual circuit identification as the virtual private local area network instance.

7. The method of claim 6, wherein the transmitting includes establishing a label distribution protocol session when the first node and the at least one other node have matching virtual circuit identifications.

8. The method of claim 7, further comprising:
   exchanging service labels between the first node and the at least one other node.

9. The method of claim 1, wherein the transmitting includes logging and reporting unsuccessful attempts to a user of the first node.

10. The method of claim 1, wherein the interior gateway protocol map identifies a loopback address of the at least one other node.

11. A method of configuring a virtual private local area network service, the method comprising:
    assigning, by an operator, a virtual private local area network instance to a first node;
    transmitting, by the first node, a signal to establish a label distribution protocol session between the first node and at least one other node within the network based on an interior gateway protocol map, the interior gateway protocol map identifying the at least one other node and nodes connected to the at least one other node; and
    establishing, by the first node, the virtual private local area network service based on the label distribution protocol sessions that are established, wherein the interior gateway protocol map identifies a loopback address of the at least one other node, and the transmitting includes establishing label switched paths within the virtual private local area network service using a label distribution protocol and the loopback address of the at least one other node.

12. A method of discovering nodes in a virtual private local area network service using an interior gateway protocol, the method comprising:

receiving, by one of a plurality of nodes, a list of the plurality of nodes from an interior gateway protocol map, the interior gateway protocol map being established by the interior gateway protocol and identifying connections between the plurality of nodes; and transmitting, by the one of the plurality of nodes, a signal to establish a label distribution protocol session with at least one other of the plurality of nodes.

13. The method of claim 12, wherein the transmitting includes establishing a label distribution protocol session when the first node and the at least one other node have matching virtual circuit identifications.

14. The method of claim 13, wherein the transmitting further includes, establishing a label distribution protocol session with the at least one other of the plurality of nodes, wherein a service distribution point identification and a tunnel to the at least one other node is created.

15. The method of claim 14, wherein the establishing includes exchanging service labels for services between the one of the plurality of nodes and the at least one other plurality of nodes.

* * * * *